April 30, 1935. T. H. CHILTON 1,999,397
METHOD FOR DRYING ACETYLENIC FLUIDS
Filed Oct. 6, 1933
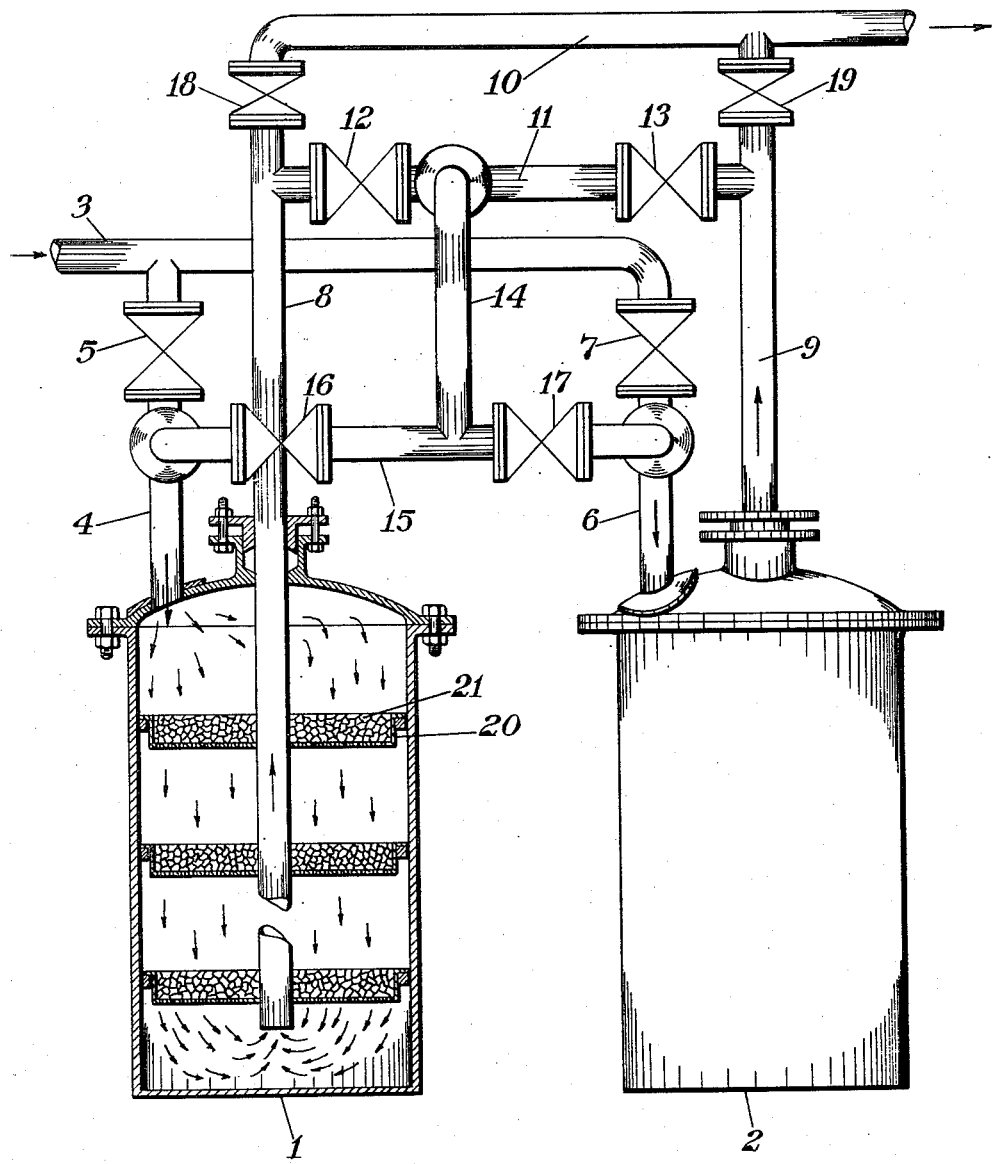
INVENTOR.
Thomas H. Chilton
BY
Arthur G. Connolly
ATTORNEY.

Patented Apr. 30, 1935

1,999,397

UNITED STATES PATENT OFFICE 1,999,397

METHOD FOR DRYING ACETYLENIC FLUIDS

Thomas H. Chilton, Wilmington, Del., assignor to E. I. du Pont de Nemours & Company, Wilmington, Del., a corporation of Delaware Application October 6, 1933, Serial No. 692,438

6 Claims. (Cl. 23—2)

This invention relates to an improved process whereby acetylenic fluids are efficiently and economically dried and more particularly refers to a process wherein moisture is removed from acetylene polymers in such a manner that further condensation of said polymers is appreciably avoided.

In recent years numerous processes have been discovered wherein acetylene is polymerized or reacted with well known compounds. The production of mono- and divinyl acetylene, by passing acetylene gas through an aqueous solution of cuprous chloride and ammonium chloride, is an illustration of such processes. The aforementioned processes, in common with other well known processes for polymerizing acetylene and/or reacting it with other compounds, is subject to the great disadvantage that expensive equipment and dangerous and time-consuming operations must be utilized in order to remove moisture from the resulting products.

Heretofore this moisture was removed by first cooling the products to temperatures of about 0° C. Such products were then passed through a heat exchanger within which they were cooled to temperatures in the neighborhood of −60° C. The water removed therefrom formed ice in the heat exchanger, and after a short period of time completely clogged the tubes. This required the incoming moisture-containing products to be passed through a second heat exchanger while the ice-bound exchanger was being thawed in order to remove the ice therefrom. The use of two heat exchangers is obviously a costly expedient, and is furthermore coupled with the danger that air will be admitted to the idle exchanger forming an explosive mixture with gases contained therein. The efficiency of the heat exchanger is likewise constantly decreased from the time that it is admitted to the system until it is removed therefrom, due to the deposition of ice.

Various well known dehydrating agents have been tried in this connection, but up to the present time none of the agents experimented with was satisfactory. The chief difficulty in the use of these dehydrating agents has been the ever-present possibility of causing further condensation of the extremely reactive products. Among the well known and commonly used dehydrating agents which would be unsatisfactory for use herein because of their tendency to react with or cause further polymerization of the extremely reactive acetylenic products are: calicum chloride, metallic sodium, magnesium perchlorate, silica gel, zinc chloride, concentrated sulfuric acid, sodium hydroxide, alumina gel, and phosphorus pent-oxide. The inapplicabilty of this large group of common dehydrating agents at once renders apparent the difficulties which confronted those desiring to dehydrate acetylenic products in an improved manner.

It is an object of the present invention to eliminate the above described difficulties commonly inherent in processes for removing moisture from acetylenic products such as acetylenic polymers and reaction products of acetylene with other compounds. A further object is to render said products anhydrous by the use of a readily available chemical agent which does not contaminate or cause further polymerization of the products. A still further object is to avoid the necessity of using a plurality of expensive heat exchangers. Additional objects will become apparent from a consideration of the following description.

These objects are attained according to the herein described invention which comprises, briefly, passing the acetylenic products through a drying apparatus containing calcium carbide. This may be accomplished by various means which will become apparent from a consideration of the following instructions. A method which has given very satisfactory results is: First cool the gases to remove entrained water and a portion of the moisture present therein. These precooled gases may then be passed through one of two drying units in which calcium carbide is distributed on a plurality of perforated trays. When it is necessary to recharge one of the units with calcium carbide the gaseous stream may be diverted through an auxiliary drying unit. Before the recharged unit is connected with the system any air contained therein may be removed by back-flushing with a small quantity of acetylene.

The accompanying drawing is a diagrammatical illustration of an apparatus suitable for carrying out the process of the present invention when the acetylenic products are in the vapor phase. In this drawing, (1) and (2) represent drying chambers; (3) represents the pipe through which the gases enter the system, (4) and (6) representing pipes by means of which the gases are admitted to the individual drying chambers, these pipes being controlled by valves (5) and (7), respectively. Pipes for conducting the dehydrated gases from the drying chambers are represented by (8) and (9), regulated by valves (18) and (19), respectively, the gases ultimately passing from the system by means of pipe (10). Pipes (11), (14) and (15), are controlled by valves (12), (13), (16) and (17), and represent portions of the apparatus which may be utilized in passing the products through the chambers in series. Perforated trays are represented by (20), the calcium carbide distributed thereon being represented by (21).

In its practical operation, acetylenic gases containing moisture are admitted to pipe (3). Assuming that (1) is the main drying unit and (2) is an auxiliary unit, valves (5) and (18) will be opened and the remaining valves closed. The entering gases will then pass through pipe (4), controlled by valve (5), downward through the layers of carbide (21), distributed on trays (20), wherein they will be intimately contacted with the carbide. After passing through the lowest tray the dehydrated gases will be withdrawn from the chamber by means of pipes (8) and (10), controlled by valve (18). If chamber (1) is being recharged, valves (7) and (19) will be opened and the remaining valves closed. The gases will then pass through chamber (2) and out of the system in a manner similar to that just described with respect to chamber (1).

Where it is desired to use the chambers in series the gases would ordinarily be passed first through the chamber containing the more nearly spent calcium carbide, and then through the chamber containing fresh carbide. Assuming that chamber (1) contains nearly spent carbide and chamber (2) the fresh carbide, this operation may be carried out in the illustrated apparatus by opening valves (5), (12), (17) and (19) and closing the remaining valves. The various means of modifying this apparatus to permit different types of operation are readily apparent and need not be discussed further herein.

Chambers (1) and (2) are advantageously cylindrical iron vessels containing perforated trays which are attached to central draw-off pipes and the interior surface of the chamber by means of gas-tight joints. The trays may be of any desired depth, but should preferably be sufficiently shallow to prevent undue packing of the calcium hydroxide produced, resulting in a high back pressure on the gas stream.

In drying 10,000 cubic feet per hour (measured at atmospheric pressure) of a gaseous mixture saturated with moisture at 0° C. and 30 pounds absolute pressure, and containing in parts by volume 85 parts of acetylene, 1½ parts of divinyl acetylene and 13½ parts of vinyl acetylene, two driers of the type illustrated would be used. These driers would be approximately 2 feet in diameter, and would each contain about three trays. The total depth of carbide in each drier would advantageously be about 7½ inches. If 4-mesh carbide were used this would amount to about 120 pounds per drier. The effluent gas from the driers would possess a moisture content sufficiently low to prevent freezing out in a heat exchanger operated at —75° C., any residual water remaining dissolved in the condensate. Without the use of the driers the aforementioned mixture would cause the tubular condenser to freeze-up in approximately 8 hours.

The size and design of the drying units, of course, depend to a great extent upon the composition and volume of fluids which are to be dehydrated and their moisture content. The amount of calcium carbide distributed in each unit and the number of trays upon which it is distributed likewise depend upon the same factors. Layers of calcium carbide having a depth of about 2 inches have been found to give satisfactory results, although it is understood that the depth and number of these layers is subject to considerable variation in accordance with the aforementioned instructions. Likewise, the perforated plates may be of various designs, since the particular manner of perforation is relatively unimportant as long as the fluids are permitted to come in intimate contact with the calcium carbide. Perforated plates may also be entirely dispensed with although results obtained with a packed tower are generally less satisfactory. When approximately 80% of the available calcium carbide has been hydrated it is ordinarily advisable to recharge the drier.

Calcium carbide when contacted with water, as is well known, produces acetylene and calcium hydroxide. Since the gaseous materials being treated were formed from acetylene and contain varying proportions of this compound they are not noticeably affected by an increase in the amount of acetylene present. Additional acetylene is removed with that already present in the gases, and requires no further equipment or expensive purification steps. Furthermore, it has been found that calcium carbide is entirely unlike the well known dehydrating agents referred to supra in that it does not act upon the products in such manner as to cause further condensation. As a result the yield of polymers or acetylene reaction products is not reduced. Likewise, no contaminants are formed, as is the case when the dehydrating agents previously referred to are used, so expensive purification treatments are unnecessary.

In the prior art it was known that calcium carbide could be used in conjunction with lime to produce absolute alcohol from commercial alcohol. It was also known that carbide could be used to free mixtures of alcohol and hydrocarbons from water. These processes are described in U. S. Patents 1,490,520 and 1,405,806, respectively. No particular difficulty was encountered in carrying out the aforementioned processes since the products to be dehydrated were relatively inert. However, in the present case an entirely different problem was encountered as the acetylene polymers and reaction products are extremely reactive and can be dehydrated only with great difficulty.

It is to be understood that the acetylenic fluids referred to in the present specification and claims comprise those fluids produced by the polymerization of acetylene and related compounds and/or their reaction with other compounds. It is, likewise, to be understood that these fluids may contain varying proportions of acetylene, ranging from very small amounts to major fractions. Although this invention is preferably carried out by contacting acetylenic gases with carbide it is to be understood that it is also intended to include the dehydration of acetylenic products in the liquid phase.

The present invention permits the ready and efficient dehydration of acetylenic products. It eliminates the necessity of using a plurality of expensive heat exchangers, with the consequent expense and danger incurred thereby. In addition, reduction in the yield of desired products and contamination of these products with deleterious side products is practically entirely avoided.

As many apparently widely different embodiments of this invention may be made without departing from the spirit and scope thereof, it is to be understood that the invention is not limited to the specific embodiments thereof except as defined in the appended claims.

I claim:

1. A process for dehydrating fluids containing highly reactive acetylenic polymers or compounds thereof which comprises contacting said fluids with calcium carbide.

2. A process for dehydrating gases containing highly reactive acetylenic polymers or compounds thereof which comprises contacting said gases with calcium carbide.

3. A process for drying gaseous acetylene polymers which comprises contacting said gases with calcium carbide.

4. A process for drying gaseous acetylene polymers which comprises passing said gases through a chamber containing calcium carbide.

5. A process for drying volatile acetylene polymers which comprises passing said polymers through a chamber containing a plurality of perforated members upon which layers of calcium carbide are distributed.

6. A process for drying a mixture of acetylene, mono-vinyl-acetylene and divinyl-acetylene which comprises passing said mixture through a chamber containing calcium carbide.

THOMAS H. CHILTON.